United States Patent
Splinter

[11] 3,762,235
[45] Oct. 2, 1973

[54] LOCKING DEVICE
[75] Inventor: Simon Splinter, Schiedam, Netherlands
[73] Assignee: N.V. Industrieele Handelscombinatie Holland, Rotterdam, Netherlands
[22] Filed: Apr. 5, 1971
[21] Appl. No.: 131,346

[30] Foreign Application Priority Data
Apr. 3, 1970  Netherlands................... 7004827

[52] U.S. Cl.................................. 74/422, 74/411.5
[51] Int. Cl............................................ F16h 1/04
[58] Field of Search................ 74/411.5, 422, 89.12, 74/89.17; 254/95, 97; 187/19, 78; 248/422; 188/69, 70, 74

[56] References Cited
UNITED STATES PATENTS
1,218,021  3/1917  Walther................................ 74/422
3,589,205  6/1971  Radevic................................ 74/422

Primary Examiner—Charles J. Myhre
Assistant Examiner—Frank H. McKenzie, Jr.
Attorney—Young & Thompson

[57] ABSTRACT

The pinion that drives a loaded vertical rack is locked by means of a second pinion also in mesh with the rack and a locking device disposed between the pinions and having relatively slidable parts each of which carries rack teeth in mesh with one of the pinions. By limiting the sliding of the two parts relative to each other, the locking member bears part of the load to which the pinions are subjected so that the pinions in locked position are partly unloaded and the entire structure can withstand a higher load.

5 Claims, 5 Drawing Figures

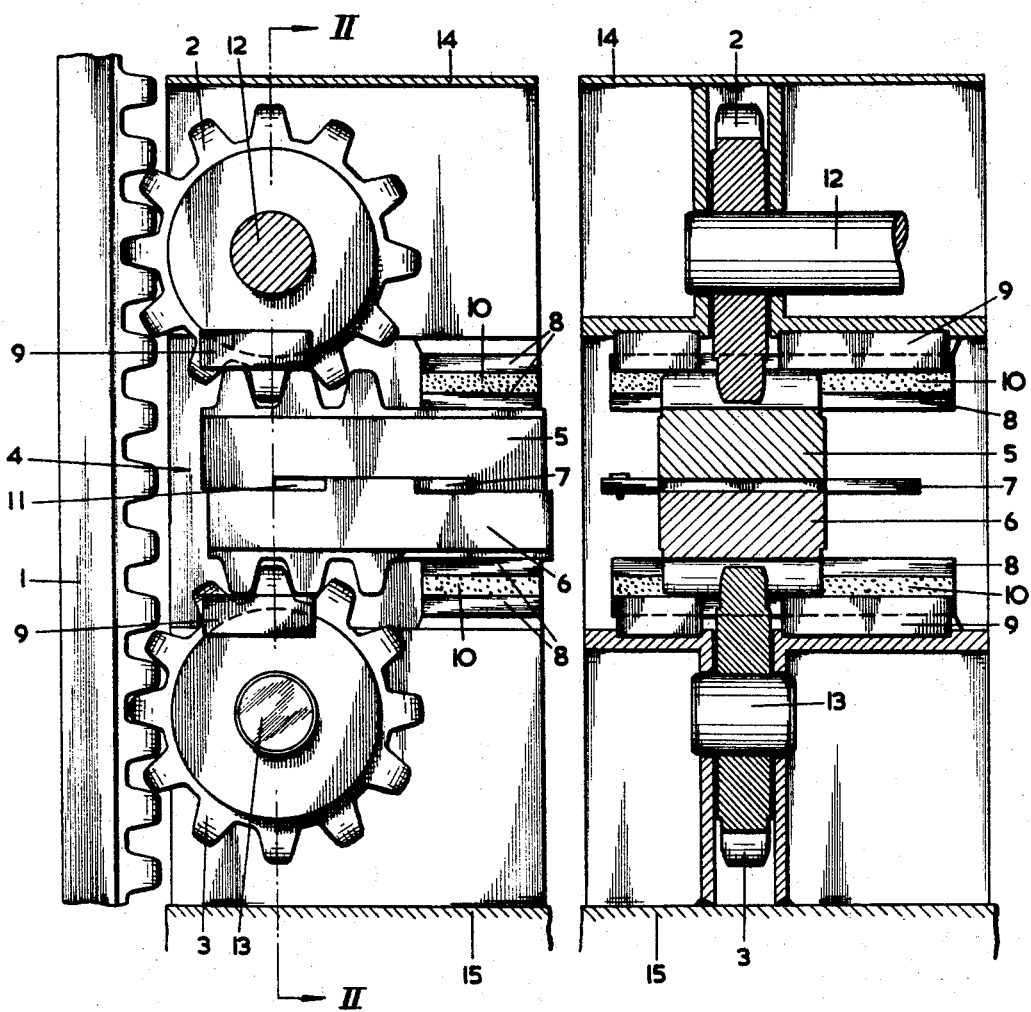

INVENTOR
SIMON SPLINTER

BY Young & Thompson
ATTORNEYS

LOCKING DEVICE

The invention relates to a locking device for locking a gear against rotation caused by a load applied thereto.

In particular the invention relates to a locking device for the mechanism designed to change the position of the platform of a self-elevating platform structure relative to its legs, which comprises a motor driven pinion which is mounted on the platform in proximity to each of the legs and meshes with a rack tooth on the leg.

Up to now, the locking of such a mechanism had been attained by a brake arrangement for the driving means of the pinion. The disadvantages of such a brake system are that it is not reliable, while said system makes it furthermore necessary that the entire platform structure has to be of a much heavier construction than is required for the actual raising process thereof. The latter is the result of the fact that it is necessary with such platform structures that the legs be subjected to a pre-loading process, i.e., each of the legs is temporarily subjected to a load which is greater than the final load applied thereto during raising of the platform.

These disadvantages are eliminated according to the present invention by the fact that the locking device comprises at least one toothed member connected or capable of being connected to the mechanism loading the gear in such a way that said member is caused by said load to move in one direction, while said member is adapted to engage the gear so that through said gear it is caused by the load to move in the direction opposite to the first-mentioned direction. In this manner the member in the locking position will moreover take over part of the load to which the gear is subjected, so that the gear in the locked position is partly unloaded so that the entire structure can withstand a higher load.

The toothed member is preferably a second gear, which may advantageously be situated at a fixed distance from the first gear and may be connected to said pinion by means of a locking rack member provided with a double row of teeth which may be arranged between the two pinions so that its one row of teeth meshes with the teeth of the first gear and its second row of teeth meshes with the teeth of the second gear.

With a structure in which the loading of the first gear takes place through a rack member meshing with the teeth of said gear, the teeth of the second gear are also advantageously in engagement with said rack member.

When applying the locking device according to the present invention for an elevating platform of the type previously indicated, it is preferable that the second gear is mounted for free rotation on the platform in proximity to the first gear.

In order that the locking rack member for coupling the two gears will be adjustable to every position of the two gears, said rack member may advantageously consist of two parts which are slidable with respect to one another in the direction perpendicular to the line through the centres of the gears and in the plane of said gears, said parts being adapted to be retained by a retaining member in the locking position.

Said retaining member preferably consists of a wedge which is adapted to be inserted between the two slidable parts of the rack member. The invention will now be explained in more detail with reference to the drawing wherein a preferred embodiment of the invention is shown.

FIG. 1 is a side elevational view of a device according to the invention.

FIG. 2 is a sectional view along the line II—II in FIG. 1.

Figure 3:
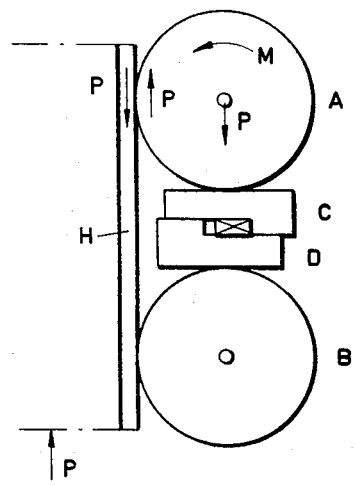
FIGS. 3, 4 and 5 show schematically the operation of the device according to the invention as shown in FIGS. 1 and 2.

In FIG. 1 is shown part of the rack member 1 on one of the legs of a platform structure 15 and one of the motor driven pinions 2 which are mounted on a drive shaft 12 journalled for rotation in a frame member 14 on the platform structure 15. A freely rotatable pinion 3 is mounted on an idle shaft 13 journalled in frame member 14 underneath the pinion 2. In the space between the two pinions 2 and 3 may be shifted a rack system 4 which comprises two parts 5 and 6, each of which is provided with teeth.

Said parts 5 and 6 are slidable with respect to one another in the plane of the drawing and in a direction perpendicular to the line connecting the centres of the pinions, so that the rack system 4 may be arranged between the pinions 2 and 3 so that the one row of teeth engages the teeth of the pinion 2 and the other row of teeth engages the pinion 3. There is a space between the two parts 5 and 6, in which a wedge 7 may be driven, causing the parts 5 and 6 to be retained in the locking position shown in the drawing if the rack member 1 should have a tendency to move in an upward direction. The rack member 4 is slidably supported by the tables 8 and 9, while there may be a part 10 consisting of resilient material embedded in the tables 8.

Figure 4:
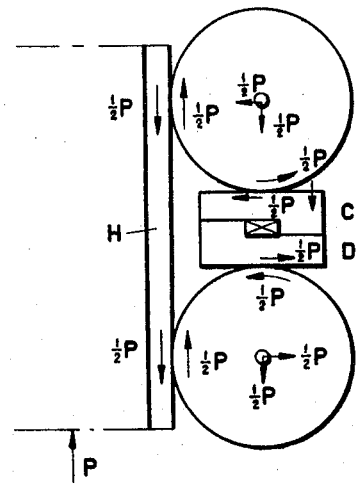
Figure 5:
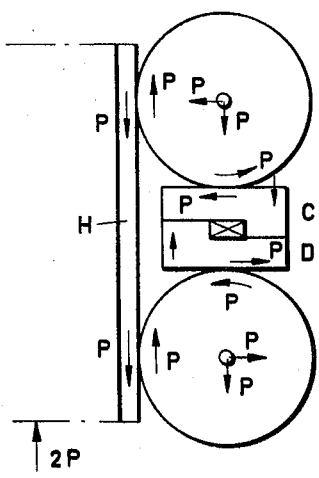

In FIGS. 3 to 5 is shown schematically the operation of the device. The pinion A is in engagement with the rack member H secured to the leg and is driven by a driving moment M which is counterbalanced by the couple of the forces P exerted by the teeth. The platform connected with the pinion A is raised in a vertical direction relative to the rack member H by said driving moment M, the pinion B rotating in the same direction as the pinion A.

When the platform is raised to the desired level, the rack members C and D are disposed between the teeth of the pinions A and B and a light pressure is exerted on the wedge positioned in the space between the rack members C and D (FIG. 4). The brake system on the driving member of the pinion A is now released so that the driving moment M is removed and there will be reached a balance in loads, as shown in FIG. 4. In essence the force exerted by the teeth on the pinion A is now halved, since the other half is taken up by the pinion B. Inasmuch as the pinions A and B are designed to bear a load P, the value of the total load on the entire system may be doubled, as is shown in FIG. 5.

If the platform has to be moved in a vertical direction again, the platform is slightly raised by applying the driving moment M on pinion A, consequently the wedge is unloaded and the rack members C and D can be retracted and unlocked.

A locking device is provided by the invention, which is particularly suitable for raising off-shore platform structures having an adjustable platform in which, among other things, the following advantages are obtained.

The motor driven pinion and its driving member have only to be adapted to take up the actual elevating load, while the pinion in the locking position is partly unloaded, so that there is a reserve in capacity for taking up additional vertical loading, for instance in case of a storm or during the pre-loading process, so that great safety is achieved. In the locked condition the entire driving and locking system may be repaired, serviced or replaced. It is also possible to take away the entire driving system where stationary platform structures are concnerned, such as offshore lighthouses, and to use said system with other platform structures. The locking and releasing procedure can be carried out rapidly and simply, so that a leg which shows a tendency to sink into the marine floor can be rapidly pressed further. If a leg has to be raised, a wedge is disposed in the space 11 in the rack system 4 allowing for a great pulling force.

It is remarked that the locking device according to the invention may also be used in a system in which the load is transmitted through a third pinion or through a chain.

What we claim is:

1. In combination with a first gear in mesh with a first rack means, a device for locking said first gear against rotation of said first gear under a load applied to said first gear by said first rack means, said locking device comprising a second gear in mesh with said first rack means, and second rack means having a double row of teeth removably disposed between the two gears such that one row of teeth is in engagement with the teeth of one gear and the other row of teeth is in engagement with the teeth of the other gear.

2. A device as claimed in claim 1, and legs on which said first rack means is mounted, a platform on which said first gear is rotatably mounted to move the platform vertically relative to said legs, said second gear being freely rotatably mounted on said platform.

3. A device as claimed in claim 1, said second rack means comprising two parts each of which has teeth thereon, said parts being slidable relative to each other in a direction perpendicular to a plane common to the axes of said gears.

4. A device as claimed in claim 3, and a removable retaining member for releasably retaining said parts in fixed relation relative to each other.

5. A device as claimed in claim 11, said retaining member comprising a wedge, said parts having a space between them for receiving and releasably retaining said wedge.

* * * * *